United States Patent [19]
Maejima

[11] Patent Number: 5,395,231
[45] Date of Patent: Mar. 7, 1995

[54] T-SHAPED FILM EXTRUSION DIE

[75] Inventor: Mokichi Maejima, Tokyo, Japan

[73] Assignee: Jyohoku Seiko Co., Ltd., Tokyo, Japan

[21] Appl. No.: 152,039

[22] Filed: Nov. 12, 1993

[30] Foreign Application Priority Data

Aug. 6, 1993 [JP] Japan .................. 5-213478

[51] Int. Cl.6 ...................... B29C 47/16; B29C 47/86
[52] U.S. Cl. ................. 425/466; 425/378.1; 425/379.1; 425/461
[58] Field of Search .............. 425/378.1, 379.1, 380, 425/382.4, 461, 466

[56] References Cited

U.S. PATENT DOCUMENTS

| 3,311,952 | 4/1967 | Kovach et al. | 425/378.1 |
| 3,767,346 | 10/1973 | Mihalik | 425/378.1 |
| 3,941,550 | 3/1976 | Marion | 425/378.1 |
| 3,949,905 | 4/1976 | Nikolov et al. | 425/378.1 |
| 4,201,534 | 5/1980 | Phipps | 425/461 |
| 4,332,543 | 6/1982 | Fulton et al. | 425/378.1 |
| 4,364,722 | 12/1982 | Phipps | 425/192 R |
| 4,659,302 | 4/1987 | Maejima | 425/466 |
| 4,797,083 | 1/1989 | Reifenhauser | 425/466 |
| 5,259,747 | 11/1993 | Cloeren | 425/466 |

FOREIGN PATENT DOCUMENTS

| 0084450 | 7/1983 | European Pat. Off. |
| 0185863 | 7/1986 | European Pat. Off. |
| 2092512 | 8/1982 | United Kingdom |

Primary Examiner—James P. Mackey
Attorney, Agent, or Firm—Bucknam and Archer

[57] ABSTRACT

A T-shaped film extrusion die for use in extrusion forming a film of a synthetic resin, has a manifold, a slot-like land, lips, inner deckles and inner deckle rods. Heat pipes are provided or disposed on both sides of the manifold so as to extend in parallel with each other in the lengthwise direction of the T-shaped die, and at least a part of the outer side surface of each of the heat pipes is exposed to the interior of the manifold over the entire length of the manifold.

6 Claims, 8 Drawing Sheets

T-SHAPED FILM EXTRUSION DIE

BACKGROUND OF THE INVENTION

1. Field of the Invention

The present invention relates to a T-shaped film extrusion die for use in forming films or sheets consisting of a synthetic resin, such as polyethylene, polypropylene and ethylene vinyl acetate, and more particularly to a T-shaped film extrusion die suitable, especially, for forming films or sheets out of a synthetic resin, such as polypropylene and ethylene vinyl acetate, without producing undesirable edge beads (unduly thick portions of a film produced at both edges thereof) and local thicker portions (non-uniform in thickness) which are encountered in a conventional film of such a resin.

2. Prior Art

The prior methods for forming polyethylene or polypropylene into films include an inflation method and a method using a T-shaped film extrusion die. Out of these methods, the latter has been utilized to produce a fertilizer bag, a moisture-proof bag or the like by extrusion forming polyethylene or the like into a film, roll pressing the thus formed film while it is hot on a metal foil, cellophane paper, kraft paper or the like to make a laminate thereof. This prior method has been widely used for the production of a wrapping material for medicine and food and of various kinds of resin sheets as well.

There have been proposed various experimental methods for producing suitable films efficiently by using such an T-shaped film extrusion die which has been later improved. These methods are illustrated in, for example, Japanese Utility Model Registration Nos. 1726281, 1603083 and 1777587 and Japanese Patents Nos. 1568629 and 1631933. All of these utility models and patents are owned by the applicant of the present application.

In cases where the conventional T-shaped film extrusion dies described in the above publications are used, films having high transparency are generally obtained, and, when a particular resin such as polyethylene is used, substantially satisfactory products which are uniform in thickness and free from edge beads are obtained.

However, the synthetic resins used in a film forming method using a T-shaped film extrusion die have recently been greatly diversified, and, besides high-, intermediate- and low-density polyethylenes (PE) which have been conventionally used, various kinds of resins, such as polypropylene (PP), ethylene vinyl acetate (EVA), ionomer, LLDP, EVOH and EAA have come to be used. Further, since the properties of a resin will vary depending on a resin producing method such as an autoclave method or a tubular method, it can be said in this respect as well that the synthetic resins used in a method using a T-shaped film extrusion die widely vary in properties.

Therefore, in a method using the conventional T-shaped film extrusion die, the following problems still arise, i.e., edge beads occur at both edges of a film or the thickness of the film is liable to become uneven depending on the kind of a resin used. Such problems occur remarkably especially when polypropylene or ethylene vinyl acetate is used.

FIGS. 5-7 show an example of a conventional T-shaped film extrusion die disclosed in Japanese Patent No. 1631933. FIG. 5 is a front elevation of this conventional T-shaped film extrusion die, FIG. 6 an enlarged sectional front elevation of the portion of this die which is in the vicinity of a side plate, and FIG. 7 a sectional view of the same T-shaped die taken along the line Y—Y in FIG. 5.

Referring to FIGS. 5-7, the T-shaped film extrusion die 1' comprises a manifold 2', a land 3', lips 4', inner deckles 5' and inner deckle rods 6'. The inner deckles 5' are supported by support rods 12' and positioned so as to extend from the upper end of the manifold 2' to the lower end of the land 3'. The inner deckle rods 6' are positioned at the lowermost portion of the land 3' so as to be spaced from the inner deckles 5' via a predetermined level of clearance. Each of the inner deckles 5' is divided into an upper inner deckle portion 5a' and a lower inner deckle portion 5b'.

Referring to FIG. 5, the arrows represent the flow of a resin. A molten resin extruded from an extruder A' flows into the land 3' through the manifold 2', and the width of the flow of the resin is restricted by the inner deckles 5' and strictly set to a final predetermined level by the inner deckle rods 6' simultaneously with the thickness of the resin being controlled by the lips 4', so as to obtain a desirable film.

In the conventional T-shaped film extrusion die, the temperature of the die is generally maintained at a temperature about 5°–10° C. higher than that of a molten resin (temperature of the resin at the inlet port of the T-shaped die) by means of external heaters (not shown) provided on the outer portions of the T-shaped extrusion die body so that the heaters are spaced at intervals of about 180 mm. However, the temperature of the resin is not necessarily uniform in the T-shaped die due to differences in distance between portions of the resin and the heaters and also due to the generation of heat by the resin. In the conventional T-shaped film extrusion die, a molten resin tends to flow faster at the central portion of a die body as shown by arrows in FIG. 5 than that at both end portions thereof. Therefore, depending on the kind of a resin used in the conventional T-shaped die, edge beads and/or non-uniform thickness will occur in the resultant film due to the uneven temperature and flow of the resin. Especially, when polypropylene or ethylene vinyl acetate is used, edge beads and/or non-uniform thickness of the resulting film will always occur.

Moreover, in the conventional T-shaped film extrusion die, the resin residing in a space (hatched portion in FIG. 6) between the inner deckles 5' and side plate 16' leaks from a clearance between the inner deckle rods 6' and lips 4' to be deposited on the film extruded from the die. The frequency of occurrence of leakage of the resin is specially high when a film having a small width is produced. The leakage of the resin occurs at a frequency of as high as not less than once per 3–5 minutes in some cases, so as to cause a decrease in the quality and yield of final products. Since the leaked resin turns into an oxidized resin and is deposited on the circumferential portions of the lips 4', the movement of the inner deckle rods 6' is obstructed and, further, it is necessary to remove the oxidized resin when the width of a film to be obtained is desired to be changed.

SUMMARY OF THE INVENTION

The present invention has been developed in view of these problems encountered in the conventional techniques, and an object of the present invention is to provide a T-shaped film extrusion die which is capable of forming films or sheets having neither edge beads nor non-uniform thickness even when there is used a synthetic resin, such as polypropylene or ethylene vinyl acetate, which has caused edge beads and non-uniform thickness to occur in a film when formed into the film by the use of the conventional techniques, and is also capable of preventing leaked resin from being deposited on the resulting film and easily carrying out an operation for changing the width of a film to be obtained.

The inventor of the present invention made intensive studies in an attempt to develop a T-shaped film extrusion die which enables the achievement of this object and, as the result of his studies, he found that the above-mentioned problems can be solved by arranging heat pipes on both sides of a manifold so that portions of the outer side surfaces of the heat pipes are exposed to the interior of the manifold over the entire length of the manifold. The present invention is based on this finding.

The present invention is directed to a T-shaped film extrusion die for use in extrusion forming a film of a synthetic resin, comprising (1) a manifold for distributing a molten synthetic resin introduced into the die, in the lengthwise direction of the die, (2) a slot-like land through which the molten resin is passed from the manifold to a discharge orifice, (3) lips for controlling the thickness of a film to be obtained by regulating the width of the discharge orifice, (4) inner deckles which are provided or disposed in each of the manifold and slot-like land at both end portions thereof, movable in the lengthwise direction of the die and adapted to restrict the width of a flow of the molten resin, and (5) inner deckle rods which are provided in the land at both end portions thereof in the vicinity of the discharge orifice, movable in conjunction with the inner deckles and in parallel with said inner deckles, and used to control the width of a film to be obtained, characterized in that heat pipes are provided on both sides of the manifold so as to extend in parallel with each other in the lengthwise direction of the T-shaped die, and at least a part of the outer side surface of each of the heat pipes is exposed to the interior of the manifold over the whole length thereof.

DESCRIPTION OF THE PREFERRED EMBODIMENTS

The T-shaped film extrusion die according to the present invention will now be described with reference to the drawings.

First, the functions of the main constituent parts of the T-shaped film extrusion die according to the present invention will now be described with reference to FIGS. 1-4.

(1) Manifold 2:

A manifold 2 is a passage having a circular, elliptic or tear-drop cross-sectional shape and extending in the central portion of a T-shaped film extrusion die 1 in the lengthwise direction thereof. A molten resin forced out under a high pressure from an extruder "A" spreads in the lengthwise direction of the T-shaped die 1 through the manifold 2 and is then introduced into a land 3.

(2) Land 3:

The land 3 is a slot-like passage, through which a molten resin is introduced from the manifold 2 into lips 4.

Figure 7:
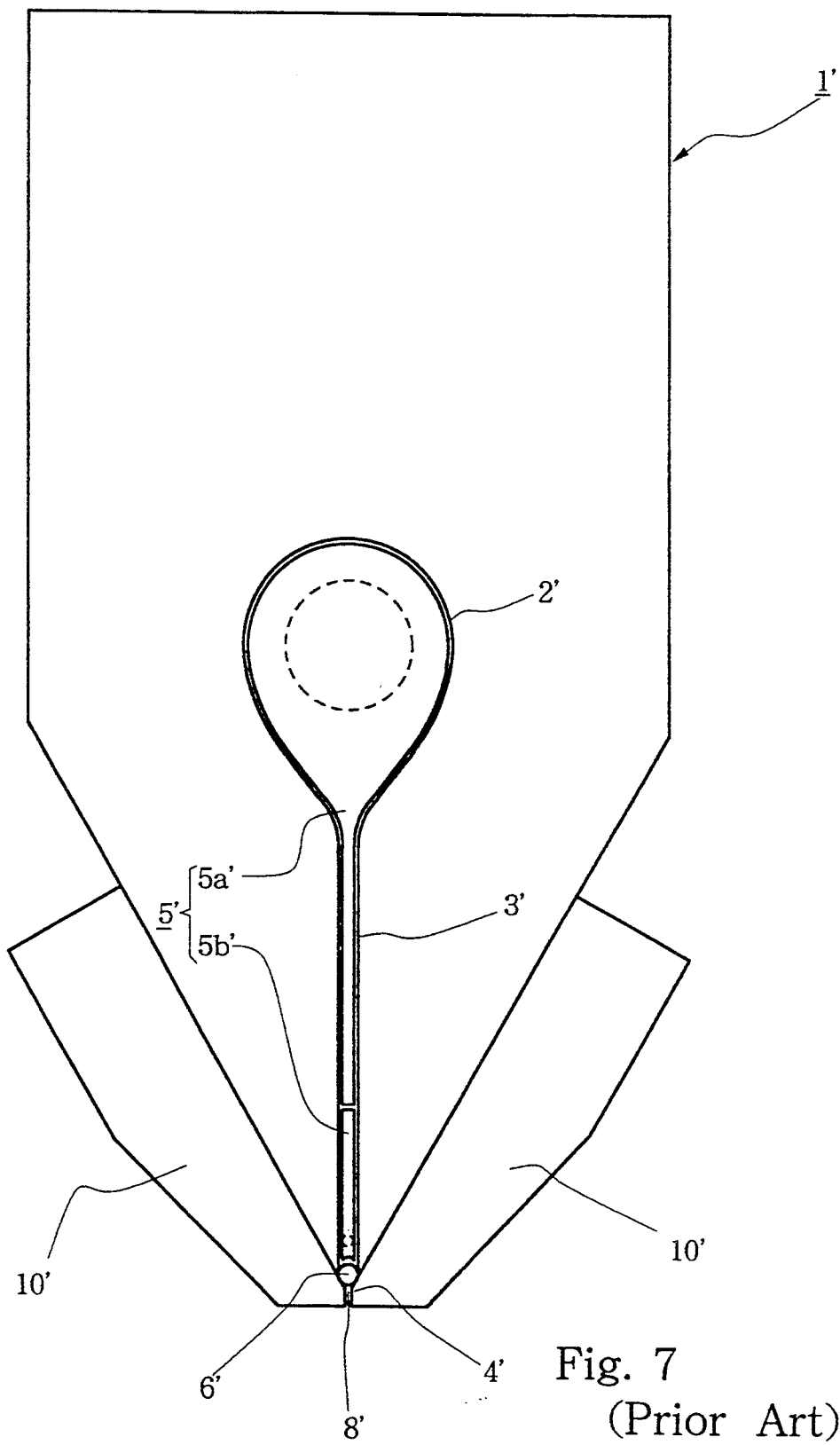
FIG. 7 is a sectional view of the conventional T-shaped die of FIG. 5 taken along the line Y—Y therein.

(3) Lips 4:

The lips 4 constitute therebetween a discharge orifice (outlet for resin) 8, through which a high-pressure molten resin is extruded to form a film. The thickness of the film can be controlled by regulating the distance or space between the lips 4, i.e. the width of the discharge orifice 8. A T-shaped film extrusion die 1 shown in FIGS. 3-4 is provided with a recess 9 in one side surface of a lower portion 10 thereof, and the width of the discharge orifice 8 is regulated by moving the lower portion 10 which is below the recess 9 by a lip-regulating means 11, for example a screw. Namely, the T-shaped film extrusion die 1 is a so-called lip-bending type one. The method of regulating the lips 4 in the present invention is not specially limited, and there may be employed a conventional type method, as shown in FIG. 7, in which the width of a discharge orifice 8' is regulated by moving lip members 10' provided on both sides of the T-shaped film extrusion die, by use of a lip-regulating means (not shown).

(4) Inner deckles 5 (a combination of an upper inner deckle portion 5a and a lower inner deckle portion 5b is collectively called "inner deckle 5":

The inner deckles 5 are provided respectively in both end portions of the manifold 2 and land 3, and designed so that a clearance or space between the inner deckle 5 and the inner surface of the manifold 2 and land 3 is preferably around 0.05-0.2 mm. The inner deckles 5 can be moved in the lengthwise direction of the T-shaped die 1 by means of support rods 12 connected to the deckles 5, respectively, and the width of a molten resin flowing in the manifold 2 and land 3 is regulated by increasing or decreasing the distance between these inner deckles 5.

The inner deckle 5 is preferably divided into an upper inner deckle portion 5a and a lower inner deckle portion 5b in the same manner as those disclosed in Japanese Patent No. 1568629, and support rods 12a, 12b are preferably connected to these inner deckle portions 5a, 5b, respectively. This construction makes it possible to regulate the upper and lower inner deckle portions 5a, 5b independently, and restrict the width of a flowing resin more smoothly.

(5) Inner deckle rods 6:

The inner deckle rods 6 are provided in the land 3 at its both end portions and between the discharge orifice 8 and the lower ends of the inner deckles 5 so that the inner deckle rods 6 are spaced a predetermined distance, preferably a distance of around 0.1–0.5 mm, apart from the lower ends of the inner deckles 5, respectively. The inner deckle rods 6 are movable in conjunction with the inner deckles 5 and in parallel therewith, respectively. The width of a molten resin flowing in the land 3 is finally regulated by regulating the distance between both the inner deckle rods 6 so as to determine the width of a film to be obtained.

The characteristics of the T-shaped film extrusion die of the present invention will now be described with reference to the drawings.

As shown in FIGS. 1–4, heat pipes 7 are provided on both sides of the manifold 2 in the T-shaped film extrusion die of the present invention so that the heat pipes 7 extend in parallel with the lengthwise direction of the T-shaped die 1. Moreover, at least a part of the outer side surface of each of the heat pipes 7 is exposed to the interior of the manifold 2 over the entire length thereof.

The heat pipes 7 used in the present invention are heat conductive pipes containing a suitable heat medium therein. Even when these pipes 7 are heated partially, the heat is distributed speedily over the whole length thereof, and the temperature of the pipes 7 as a whole is maintained at a uniform level at all times. The heat pipes 7 shown in FIGS. 1–4 are closed-type heat pipes having none of their own heating means, and they are heated with the heat of the T-shaped extrusion die 1 heated by an external heater (not shown) and the heat of a molten resin contacting the heat pipes 7. The heat pipes 7 as a whole are kept uniformly at a temperature equal to the average of the temperatures of the T-shaped extrusion die and molten resin. The heat pipes used in the present invention are not particularly limited to the above-described ones; they may be heat pipes of other types which have there own suitable heating means.

The heat medium used in the heat pipes preferably has various characteristics including high thermal stability, high heat conductivity, low corrosiveness and freedom from flammability and ignitability, and is suitably selected depending on the temperature (usually 180°–340° C.) of a molten resin from heat mediums including naphthalene, naphthalene derivatives (such as alkylnaphthalenes), phenyl ethers, polyphenyls and allyl alkanes.

The material for the heat pipes is preferably such that it is not corroded with the heat medium used and has a high pressure resistance and a high heat conductivity; and it is, for example, stainless steel or brass. In order to prevent the oxidation of a molten resin contacting the heat pipes and the adhesion of the resin thereto and increase the slidability of the outer surfaces of the heat pipes, these outer surfaces are preferably plated with hard chromium or the like.

When portions of the inner side surface of the manifold 2 are designed to be formed by the outer side surfaces of the heat pipes 7 according to the present invention, the molten resin flowing from the manifold 2 into the land 3 directly contacts the heat pipes 7 having a uniform temperature, so that the temperature of the resin, which has become non-uniform due to frictionally generated heat and the like, is made perfectly uniform in the vicinity of the heat pipes 7. When the temperature of the resin becomes uniform, the irregularity of flow of the resin is also eliminated. Accordingly, the T-shaped film extrusion die 1 of the present invention prevents the formation of edge beads on films and the production of unevenly thick films, and it also provides films free from edge beads and uneven thickness even when polypropylene or ethylene vinyl acetate is used as a material for the films.

Figure 3A:
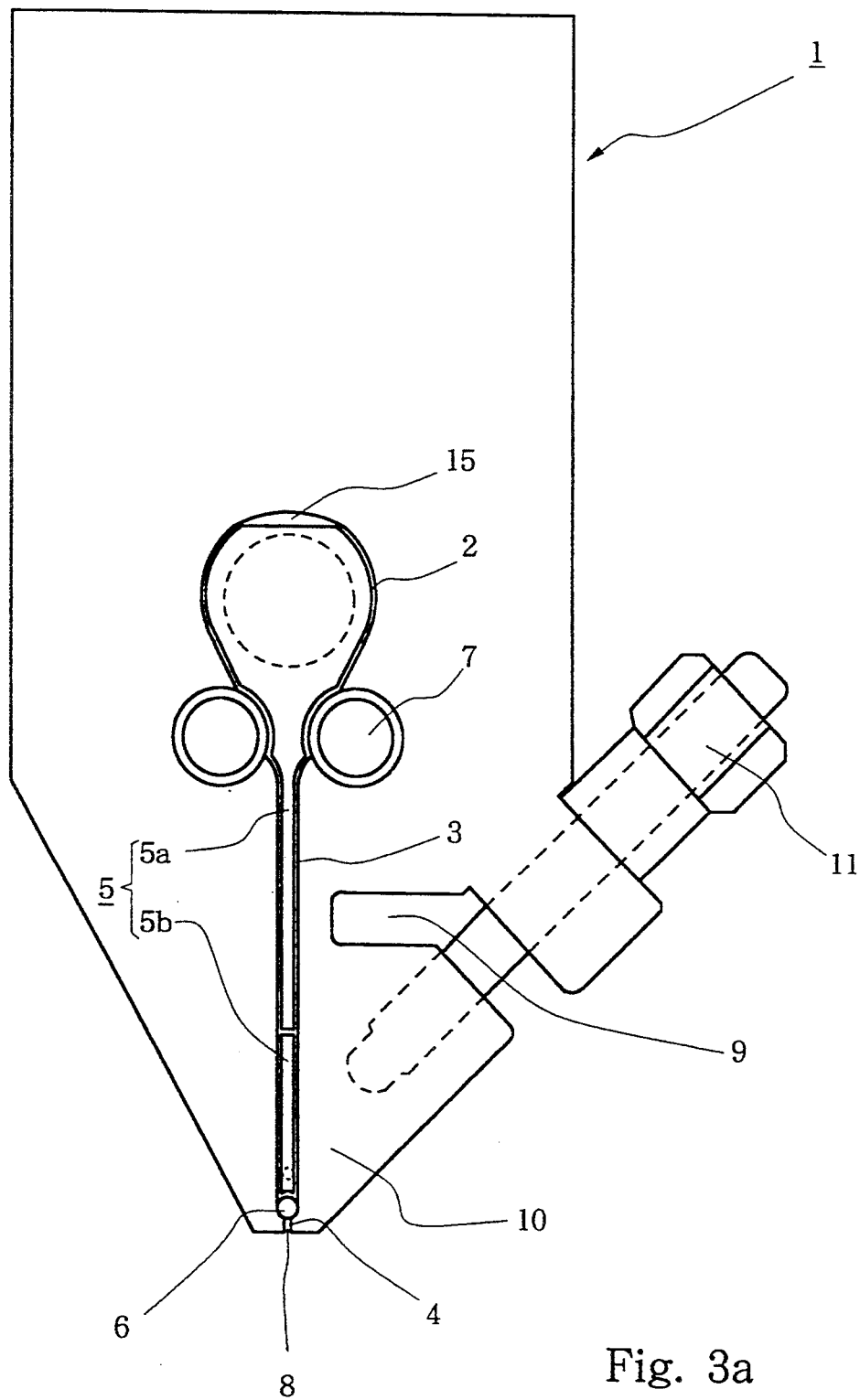
FIG. 3a is a sectional view of the T-shaped die of FIG. 1 taken along the line X—X therein.
Figure 3B:
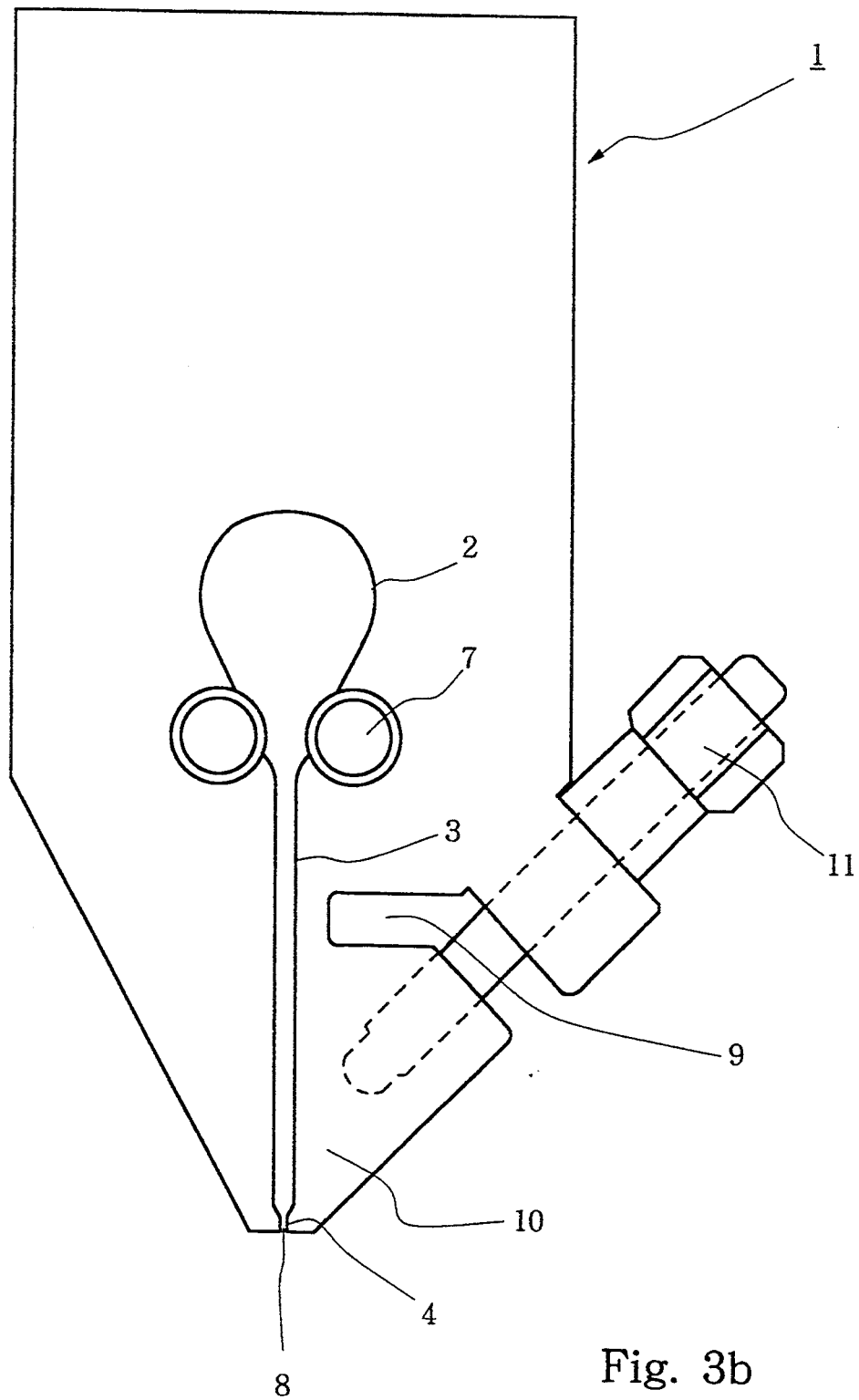
FIG. 3b is the same sectional view (deckles and deckle rods excluded) as FIG. 3a and shows that the outer side surfaces of heat pipes constitute portions of the inner side surface of a manifold of the die, respectively.
Figure 4:
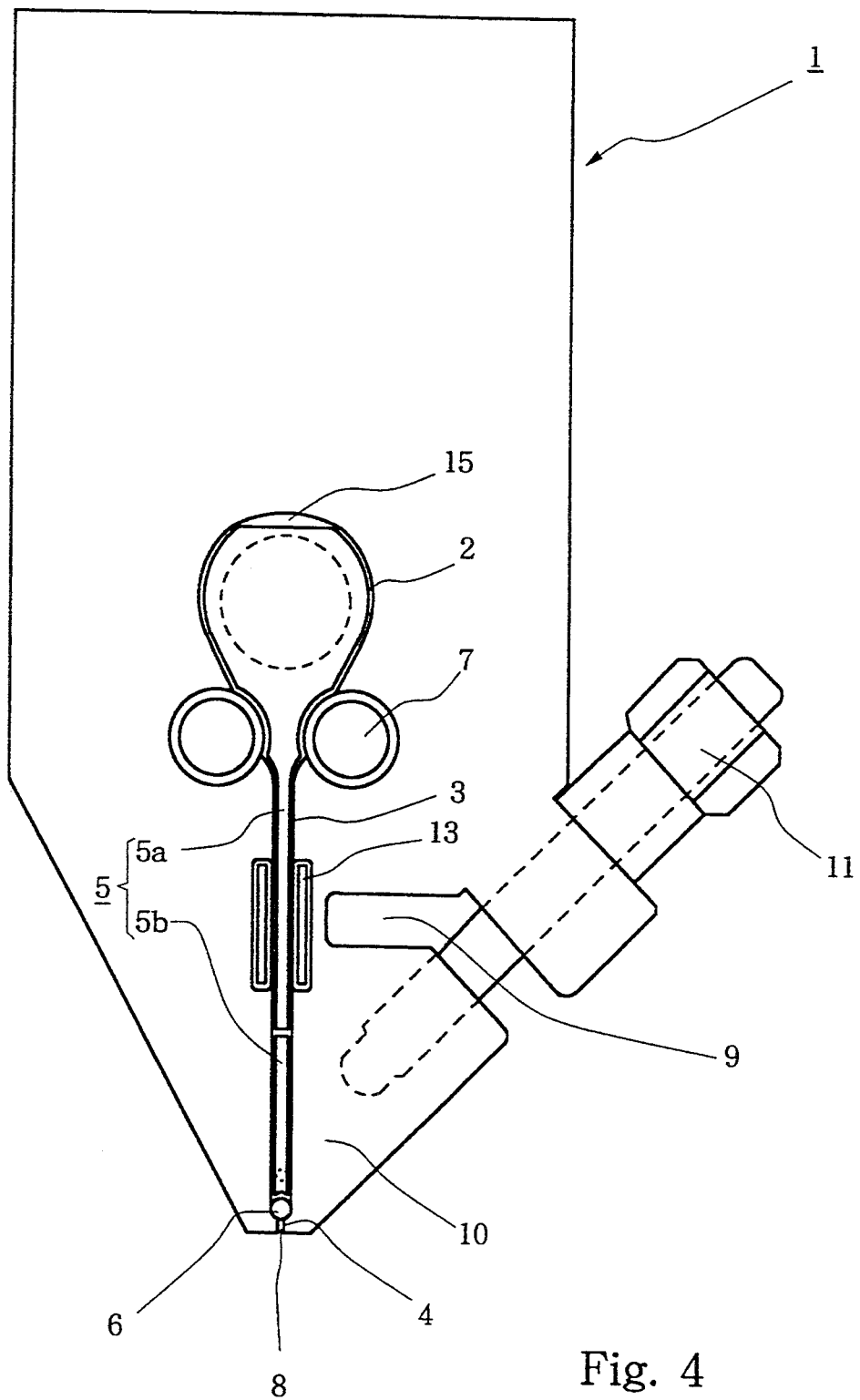
FIG. 4 is a sectional view of another embodiment of the T-shaped film extrusion die according to the present invention.

In the T-shaped film extrusion die 1 of the present invention, it is preferable that at least a part of the outer side surface of each of the heat pipes 7 projects into the interior of the manifold 2 as shown in FIGS. 3a–4, especially FIG. 3b. Owing to the outer side surfaces of the heat pipes 7 projecting preferably around 3–4 mm into the interior of the manifold 2, the molten resin flowing from the manifold 2 into the land 3 is controlled to keep a uniform pressure by the action of a nozzle formed between these heat pipes. Therefore, in the T-shaped film extrusion die thus constructed, the resin flows more uniformly whereby the formation of edge beads on films and the production of unevenly thick films tend to be prevented more reliably.

In the case where the heat pipes 7 project into the interior of the manifold 2 as mentioned above, it is necessary that grooves the cross-sectional shape of which is in conformity with that of the projecting outer surface portions of the heat pipes 7 be formed in the inner deckles 5. These grooves are preferably so designed that the width of a clearance between an inner deckle 5 and a corresponding heat pipe 7 becomes around 0.2–0.5 mm so as to prevent the heat pipe 7 from being hurt by the inner deckle 5.

As shown in FIG. 4, in the T-shaped film extrusion die 1 of the present invention, heat pipes 13 may also be provided on both sides of the land 3 so as to extend in parallel with the lengthwise direction of the T-shaped die 1, and at least a part of the outer side surface of each heat pipe 13 is preferably exposed to the interior of the land 3 over the entire length thereof. When the T-shaped die is thus formed, the flow of the molten resin flowing down in the land 3 is rendered perfectly uniform again in the vicinity of the heat pipes 13, so that the formation of edge beads on films and the production of unevenly thick films is prevented more reliably without being influenced by the heat generation of the resin in the land 3.

Although the width of the land in a conventional T-shaped film extrusion die is usually 4–5 mm, the width of the land 3 in the T-shaped film extrusion die 1 of the present invention is preferably 2.7–3.2 mm. When the land 3 is narrowed as mentioned above, the molten resin is controlled to keep a more uniform pressure by the action of a nozzle formed in the land 3, and the molten resin contacts the heat pipes 7 more uniformly, so that the flow and temperature of the resin tend to be rendered more uniform. Therefore, as described above, it is especially effective to reduce the width of the land 3 in the T-shaped film extrusion die 1 in order to reliably prevent the generation of edge beads on films and uneven film thickness therein. When the width of the land 3 is too small, the strength of the inner deckles 5 and inner deckle rods 6 becomes undesirably insufficient.

Figure 5:
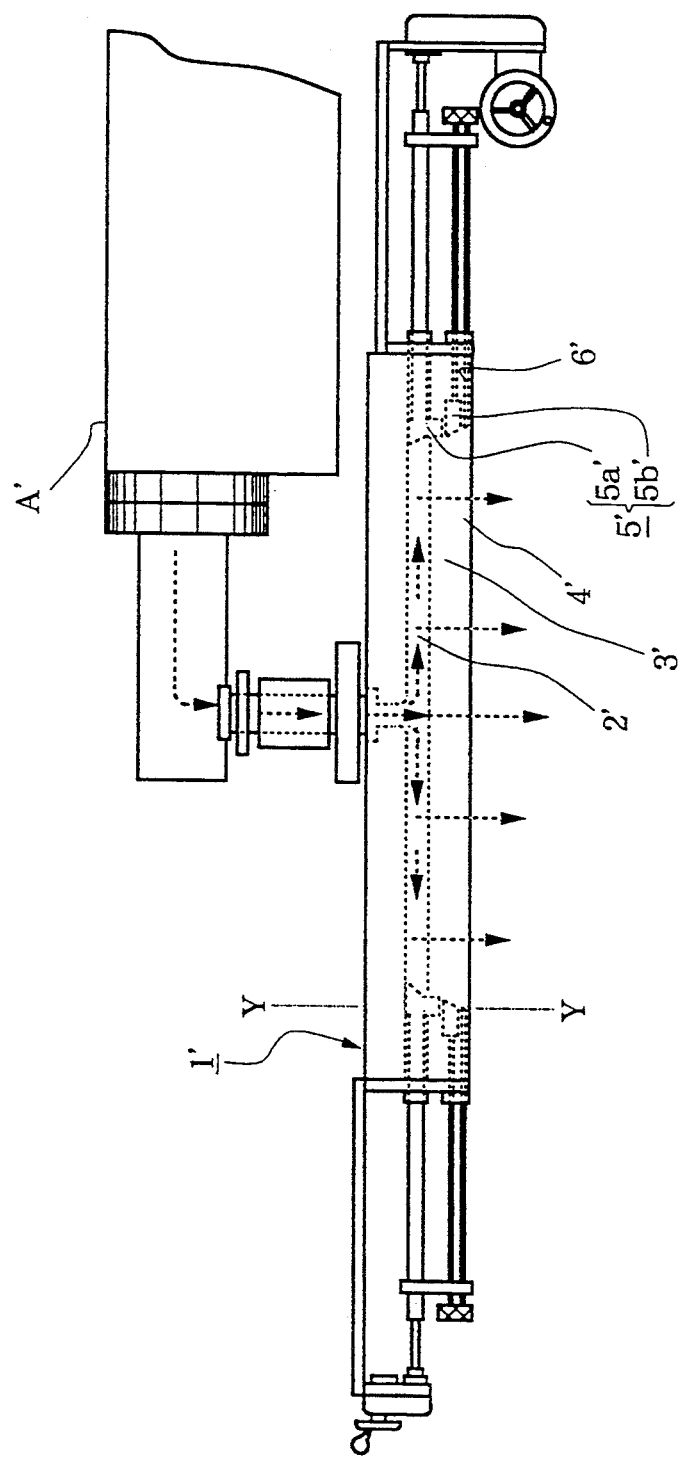
FIG. 5 is a front elevation of a conventional T-shaped film extrusion die.
Figure 6:
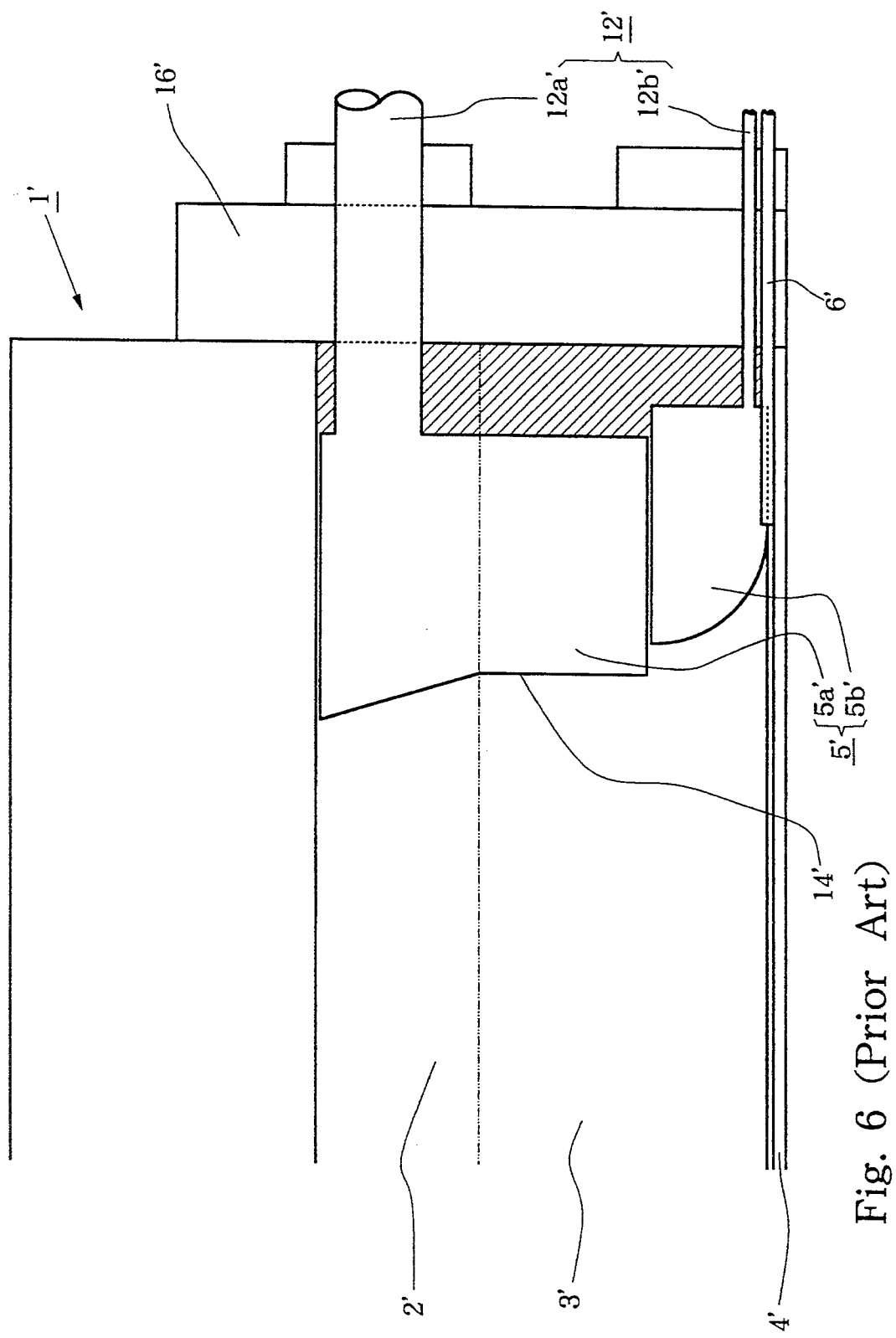
FIG. 6 is an enlarged sectioned front elevation of a portion of the conventional T-shaped die of FIG. 5 which is in the vicinity of a side plate of the die.

It is preferable in the T-shaped film extrusion die 1 of the present invention that the inner deckles 5, especially the upper inner deckle portions 5a, be formed into such special shapes that have not been seen in any conventional extrusion dies of this kind and will be described below. The conventional inner deckles 5', especially upper inner deckle portions 5a', have resin flow-control surfaces 14' which are perpendicular to the lengthwise direction of the T-shaped die as shown in FIGS. 5–6.

On the other hand, the resin flow-control surfaces 14 as a whole of the upper inner deckle portions 5a in the T-shaped film extrusion die 1 of the present invention are preferably inclined outward with respect to the vertical axis of the die as shown in FIGS. 1–4. When the resin flow-control surfaces perpendicular to the lengthwise direction of the T-shaped die are improved as mentioned above, the flow of the molten resin advancing from the manifold 2 to the land 3 becomes smooth so that the resin pressure becomes more uniform in the land 3 with the result that the generation of edge beads and uneven film thickness tends to be prevented more reliably.

Figure 1:
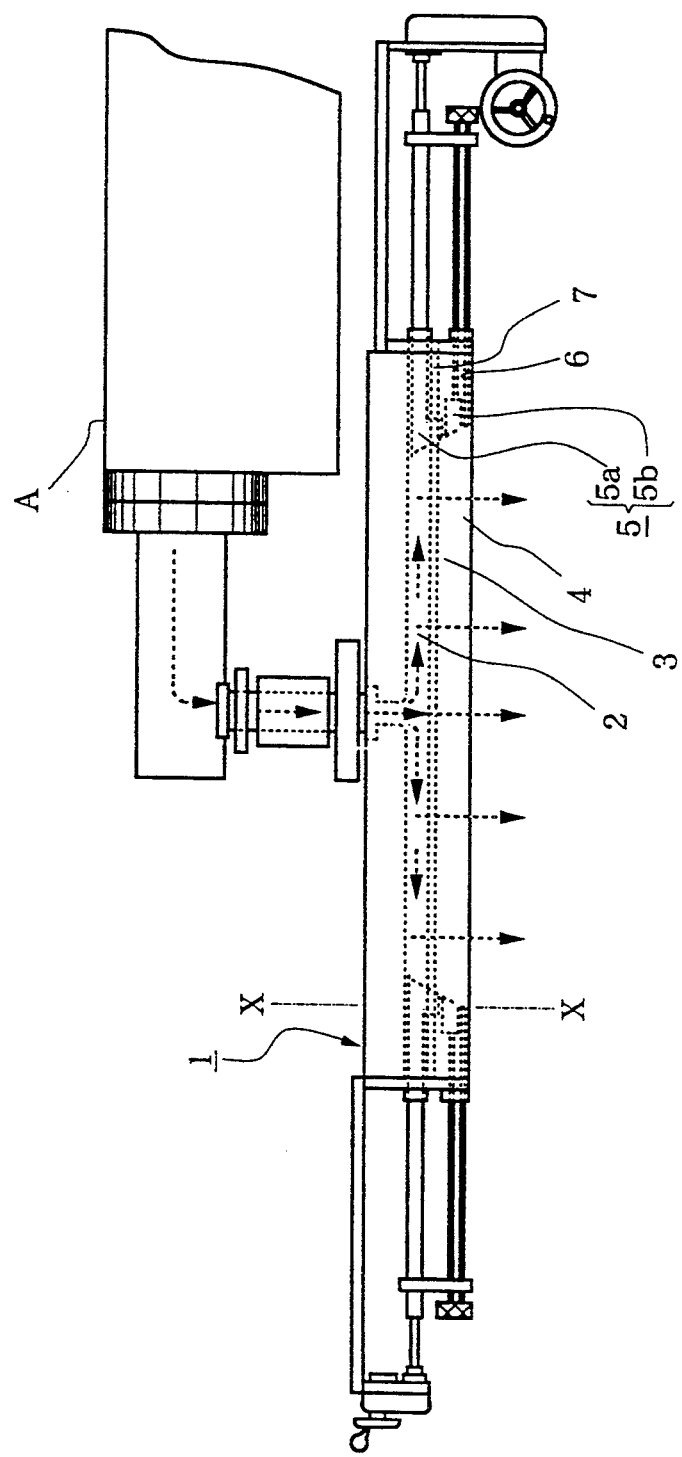
FIG. 1 is a front elevation of an embodiment of the T-shaped film extrusion die according to the present invention.
Figure 2:
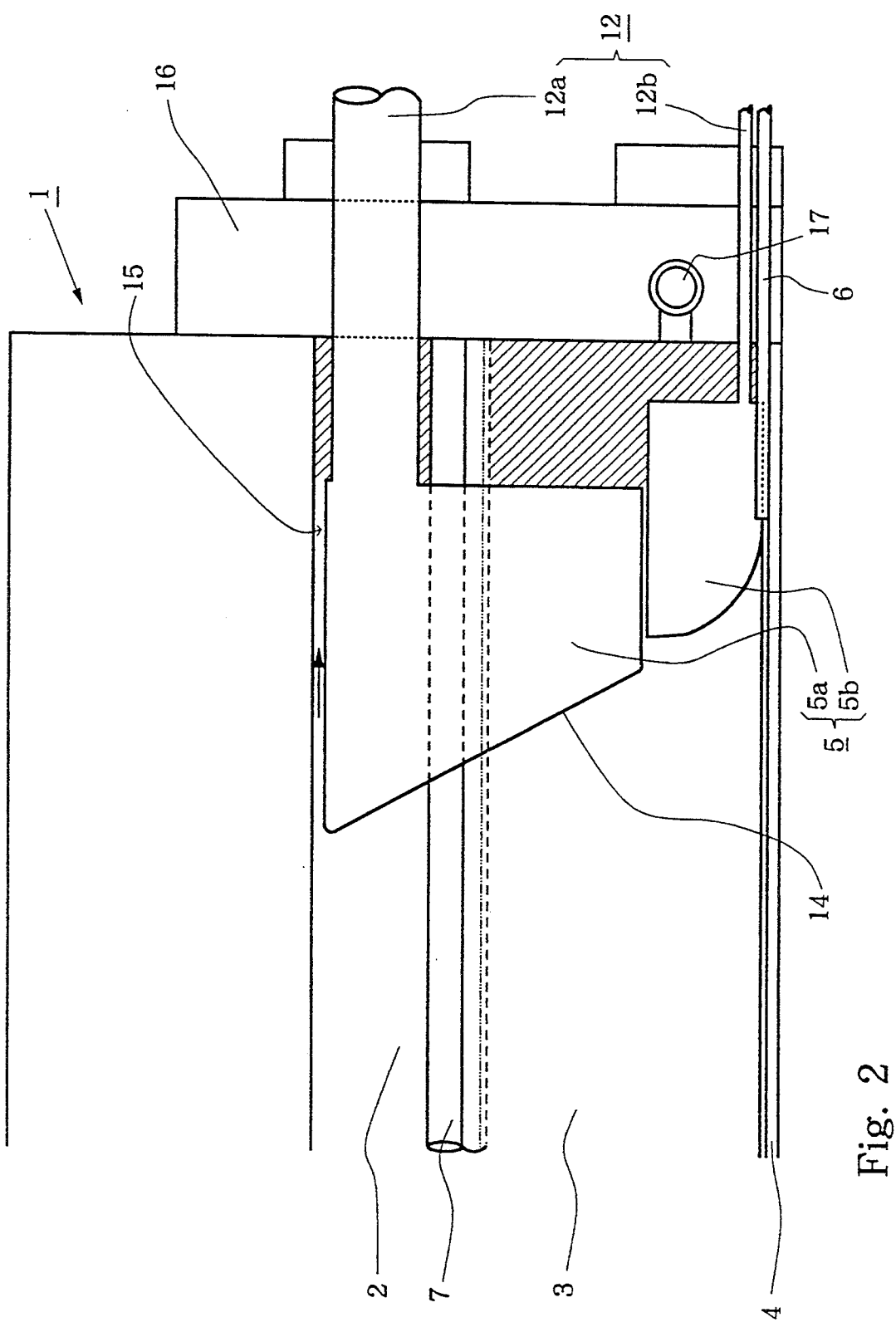
FIG. 2 is an enlarged sectional front elevation of a portion of the T-shaped die of FIG. 1 which is in the vicinity of a side plate of the die.

In the inner deckle 5 in the T-shaped film extrusion die 1 of the present invention, a recess 15 for passing a part of the molten resin into a space behind the inner deckle 5, i.e. a space between the inner deckle 5 and side plate 16 as shown by an arrow in FIG. 2 is preferably formed (refer to FIGS. 2–4). When this recess 15 is provided, the resin pressure in the space hatched in FIG. 2 increases to cause the inner deckle rods 6 to be pressed against the upper end surfaces of the lips 4. Consequently, the leakage of the resin from the clearance between the inner deckle rods 6 and lips 4 is perfectly prevented. Accordingly, the deposition of a leakage resin on a film will not occur, and the quality and yield of films to be obtained will be improved. Since the deposition of oxidized resin on the circumferential portion of the lips 4 does not occur, the inner deckle rods 6 are always moved smoothly, and a film-width changing operation can be carried out easily.

The size of the above-mentioned recess 15 (height of the recess) is preferably 1.5–5.0 mm, more preferably around 3 mm, to apply a sufficiently high pressure to the space hatched in FIG. 2.

It is preferable in the T-shaped film extrusion die of the present invention to provide the side plate 16 with a purging plug 17 for removing the resin from the space between the inner deckle 5 and side plate 16 when the distance between the opposing inner deckles 5 is increased (refer to FIG. 2).

The T-shaped film extrusion die of the present invention may be covered at its upper portion with a warmth-keeping cover (not shown) or may be provided with a cooling means (not shown) and the like so as to heat or cool the interior of the die efficiently when there is used a resin different in kind from the resin so far used.

As described hereinabove, the T-shaped film extrusion die of the present invention enables the temperature and flow of the resin to be set uniform, and, therefore, when this die is used, it will perfectly prevent the generation of edge beads on films and uneven film thickness irrespective of the kind of a resin in use. Consequently, the T-shaped film extrusion die of the present invention makes it possible to form films or sheets completely free from edge beads and uneven film thickness even when there is used a synthetic resin such as polypropylene or ethylene vinyl acetate which has conventionally been formed into satisfactory films in a very low yield since it generates edge beads and uneven film thickness when formed into films by the use of a conventional T-shaped film extrusion die.

The T-shaped film extrusion die of the present invention when used, will make it possible to perfectly prevent the leakage of a resin from a space between the inner deckle rods and lips and the adhesion of a leaked resin to a film, so that the resulting product films are improved in quality and yield. Additionally, since any oxidized resin does not adhere to the lips and their circumference, the inner deckle rods are always movable smoothly so as to facilitate a film-width changing operation to be carried out.

What is claimed is:

1. A T-shaped film extrusion die for use in extrusion forming a film of a synthetic resin, comprising (1) a manifold for distributing a molten synthetic resin introduced into said die, in the lengthwise direction of said die, said manifold extending in the lengthwise direction of said die and having two sides, two ends and two end portions in the vicinity of said ends, (2) a slot land through which said molten resin is passed from said manifold to lips having a discharge orifice therebetween, said slot land extending in the lengthwise direction of said die and having two sides, two ends and two end portions in the vicinity of said ends, (3) said lips for controlling the thickness of a film to be obtained by regulating the width of said discharge orifice, (4) inner deckles provided in both said end portions of said manifold and land, said inner deckles being movable in the lengthwise direction of said die and adapted to restrict the width of a flow of said molten resin, (5) inner deckle rods provided in both said end portions of said slot land and located in the vicinity of said discharge orifice, movable in conjunction with said inner deckles and in parallel therewith, and used to control the width of the film to be obtained, and (6) heat pipes each having an outer side surface provided on both said sides of said manifold so as to extend in parallel with each other in the lengthwise direction of said T-shaped die, and at least a part of the outer side surface of each of said heat pipes is exposed to the interior of said manifold over the entire length of said manifold.

2. The T-shaped film extrusion die according to claim 1, wherein said land is also provided on both said sides of said land with additional heat pipes each having an outer side surface and extending in parallel with each other in the lengthwise direction of said T-shaped die, and at least a part of the outer side surface of each of said additional heat pipes is exposed to the interior of said land over the entire length thereof.

3. The T-shaped film extrusion die according to claim 1, wherein said T-shaped extrusion die has a vertical axis, each of said inner deckles is divided into an upper inner deckle portion and a lower inner deckle portion, said upper inner deckle portion has a resin flow control surface portion, said surface portion is inclined outwardly and downwardly with respect to said vertical axis of said T-shaped die.

4. A T-shaped film extrusion die according to claim 1, wherein a space is provided between said inner deckle and the ends of said manifold and said inner deckles are provided with a recess through which a part of said molten resin is passed and said molten resin is introduced into said space.

5. A T-shaped film extrusion die according to claim 1, wherein at least a part of the outer side surface of each of said heat pipes projects into the interior of said manifold, and each of said inner deckles is provided with a groove the cross-sectional shape of which is in conformity with that of said projecting part of the outer side surface of each of said heat pipes.

6. A T-shaped film extrusion die according to claim 1, wherein the width of said slot land is 2.7–3.2 mm.

* * * * *